Sept. 23, 1969    B. L. DOLL ETAL    3,468,135
FOOD CHILLING USING CARBON DIOXIDE REFRIGERANT
Filed Jan. 2, 1968    2 Sheets-Sheet 1
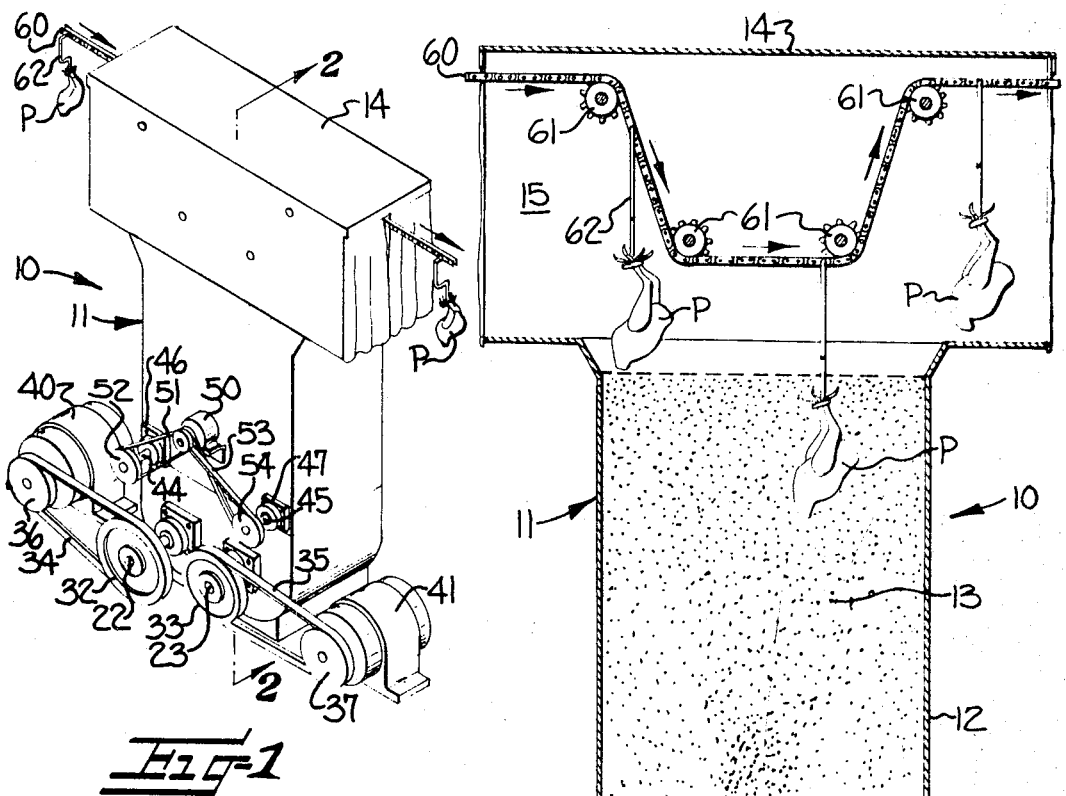
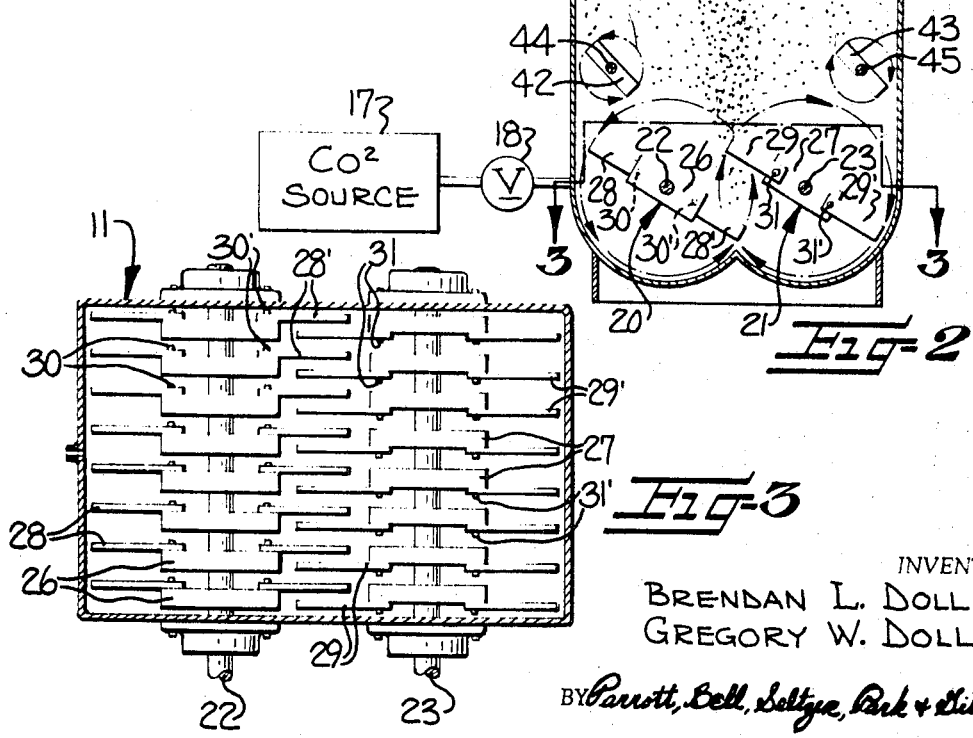
INVENTORS
BRENDAN L. DOLL and
GREGORY W. DOLL
BY Parrott, Bell, Seltzer, Park & Gibson
ATTORNEYS

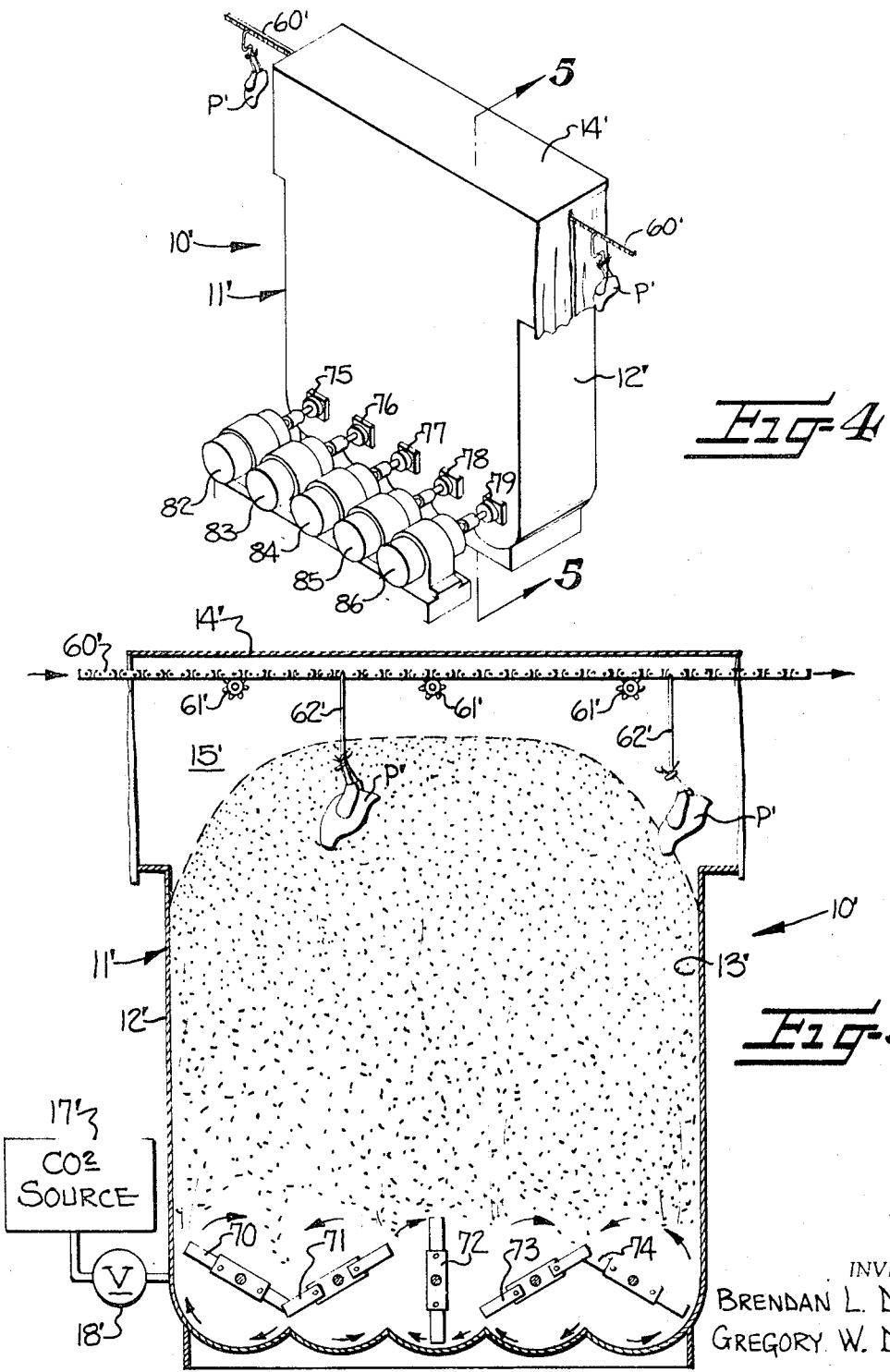

United States Patent Office 3,468,135
Patented Sept. 23, 1969

3,468,135
FOOD CHILLING USING CARBON DIOXIDE REFRIGERANT
Brendan L. Doll and Gregory W. Doll, both of Patterson, N.C. 28661
Filed Jan. 2, 1968, Ser. No. 695,122
Int. Cl. F25d 3/12
U.S. Cl. 62—63                                   16 Claims

ABSTRACT OF THE DISCLOSURE

Apparatus for and method of chilling food products utilizing finely divided particles of solid refrigerant wherein a plurality of rotors in the lower portion of a vertically extending housing are rotated in such directions and at such speeds as to impart substantially continuous motion to the refrigerant particles and to form a bed of such moving refrigerant particles through which the food products are moved for chilling while preventing agglomeration of the refrigerant particles.

---

The present invention relates to apparatus for and method of chilling food products and more particularly to such an apparatus and method utilizing finely divided particles of solid refrigerant in substantially continuous motion to impinge directly against and in solid-to-solid heat transfer relationship with food products to be chilled.

In the processing of many food products, and particularly those food products which are subject to the weepage of fluid therefrom and to substantial microorganism growth at higher temperatures, it is very desirable to reduce the temperature of the food product to a preservation temperature wherein fluid weepage and micro-organism growth are effectively curtailed as early as possible in the processing thereof. For ease of discussion, the present invention will be related to and described in connection with the processing of poultry, but is by no means to be considered as being restricted thereto.

After plucking and evisceration, the poultry carcasses are commonly placed in and moved through a bath of water and wet ice for a predetermined period of time sufficient for the temperature thereof to be lowered to 35° to 40° F., according to U.S.D.A. standards. Thereafter, the additional processing and packaging incident to providing a finished poultry product usually result in a temperature rise of from about 10° to 15° F. in the poultry.

Since the temperature of fresh or unfrozen poultry should be reduced and maintained as close as possible to 28° F. for optimum preservation, it is common practice to place the poultry after packaging in high capacity refrigerated spaces for a considerable dwell time sufficient to effect cooling thereof to the desired preservation level. Such chilling of the poultry requires considerable floor space, capital outlay and is very expensive.

A poultry chilling system (Spyroflex) is presently available which relatively quickly reduces the temperature of the poultry, usually after packaging, through the use of mechanical refrigeration. However, the cost and size of this system are such that the system has not proven practical for most installations.

Since it is well recognized that the most efficient heat transfer is through intimate contact of a solid refrigerant with the product to be chilled and generally because of economic attractiveness, an effective chilling apparatus and method utilizing finely divided particles of solid refrigerant have long been sought. However, no such apparatus and methods have heretofore been provided since all previously proposed apparatus and methods have suffered from major deficiencies, such as lack of sufficient cooling capacity, inability to cope with agglomeration of the refrigerant particles and many other such problems.

With the foregoing in mind, it is an object of the present invention to provide an apparatus for and method of chilling food products utilizing finely divided particles of solid refrigerant which obviates the problems heretofore encountered with previous chilling apparatus and methods by providing an economically feasible chilling apparatus and method which prevent agglomeration of the refrigerant particles.

It is a more specific object of the present invention to provide an apparatus for and method of chilling food products utilizing finely divided particles of solid refrigerant of the character described wherein substantially continuous motion is imparted to the refrigerant particles to form a bed thereof and the food products to be chilled are moved through the thusly formed bed so that the moving refrigerant particles may impinge directly thereagainst, all without agglomeration of the refrigerant particles.

Some of the objects of the invention having been stated, other objects will appear as the description proceeds, when taken in connection with the accompanying drawings, in which—

FIGURE 1 is an isometric view of one embodiment of apparatus embodying the features of the present invention;

FIGURE 2 is an enlarged, partially schematic, vertical sectional view taken substantially along line 2—2 in FIGURE 1;

FIGURE 3 is an enlarged horizontal sectional view taken substantially along line 3—3 in FIGURE 2;

FIGURE 4 is a view similar to FIGURE 1 of another embodiment of apparatus embodying the features of the present invention; and FIGURE 5 is an enlarged, partially schematic, vertical sectional view taken substantially along line 5—5 in FIGURE 4.

Referring now to the drawings and more particularly to FIGURE 1, there is shown an apparatus generally indicated at 10 utilizing finely divided particles of solid refrigerant for chilling food products. Apparatus 10 includes a housing 11 having a lower portion 12 which is generally vertically extending and defines therewithin an enclosed space 13 of predetermined vertical dimension. The horizontal dimensions of this space may vary depending upon the cooling capacity and speed of operation required. Housing 11 also includes an upper portion 14 which is generally horizontally extending and defines an enclosed space 15 which communicates with the upper portion of the lower housing portion 12. Housing 11 includes a base 16 which supports the lower and upper housing portions. While not illustrated, housing 11 is suitably insulated from the exterior atmosphere to reduce cooling losses from the apparatus.

Means 17 (FIGURE 2) is provided and is connected to lower portion 12 of housing 11 for delivering predetermined amounts of finely divided particles of solid refrigerant into the space 13. Means 17 may be of any suitable character, but preferably is a source of liquid $CO_2$ under pressure which is connected by a suitable metering device 18 to lower housing portion 12. By this arrangement, metered amounts of liquid $CO_2$ are delivered into space 13 where expansion occurs and the liquid $CO_2$ sublimates into substantially equal amounts of finely divided particles of solid $CO_2$ or $CO_2$ snow and $CO_2$ gas.

The metering device 18 may be operated as needed to replenish the supply of particles of refrigerant as by a timing device or other suitable means (not shown). Also, if desired, a separate sublimation chamber may be provided for forming the $CO_2$ snow which may then be fed into the space 13 in housing 11. This arrangement would permit recovery and reuse of the $CO_2$ gas formed during sublimation.

It has also been discovered that agglomeration of the solid $CO_2$ particles is significantly retarded by the addition of finely divided particles of wet ice to the space 13 with $CO_2$ snow at least during initial operation of the apparatus following a period of stoppage. At present, it appears that about one (1) part wet ice per sixteen (16) parts $CO_2$ snow provides the best agglomeration retarding action.

While finely divided particles of solid $CO_2$ are preferred as the refrigerant for use in apparatus 10, it is contemplated that other solid refrigerants may be used. For example, super cooled or super frozen wet ice particles may be used and these super frozen particles may be formed by exposing or flooding wet ice particles with liquid nitrogen.

Impeller means communicates with space 13 of lower housing portion 12 for imparting substantially continuous motion to the finely divided particles of solid refrigerant and for forming a bed of such moving refrigerant particles within space 13. Such means comprises a pair of rotors generally indicated at 20, 21 mounted in the lower part of lower housing portion 12 for rotation about spaced apart, parallel, generally horizontal axes defined by shafts 22, 23. Shafts 22, 23 are supported for rotation in suitable bearings 24, 25 mounted on the exterior of lower housing portion 12. Rotors 20, 21 include a plurality of spaced apart hub members 26, 27 mounted on shafts 22, 23 respectively, for rotation therewith. Respective pairs of blades 28, 28a and 29, 29a are mounted on respective hub members 26, 27 of rotors 20, 21 by pivot pins 30, 30a and 31, 31a for free pivotal movement relative to each other and the hub members. Preferably the blades 28, 28a of rotor 20 are spaced axially along shaft 22 from the blades 29, 29a of rotor 21 and overlap therewith during rotation of the rotors.

Shafts 22, 23 extend outwardly beyond one wall of the lower housing portion 12 and have suitable drive pulleys 32, 33 respectively mounted thereon. These pulleys have respective belts 34, 35 disposed in driving relation thereto with the opposite ends of the belts being carried by motor pulleys 36, 37 mounted on drive shafts of suitable motors 40, 41.

Preferably, motors 40 and 41 are arranged on opposite sides of housing 11 and accordingly, rotate rotors 20 and 21 in opposite rotative directions, and these rotative directions are such that the blades of both rotors are travelling upwardly adjacent the center of housing 11. Also, the respective motor speeds and/or pulley sizes are preferably such that rotors 20 and 21 are driven at different rotative speeds, it having been discovered that substantially smoother operation and a more uniform bed of moving refrigerant particles results therefrom. For example, a very good bed of moving refrigerant particles has been achieved with approximately eleven and one-half (11½) inch diameter rotors operating at 1000 and 1250 r.p.m., respectively.

To aid rotors 20, 21 in overcoming any problems of agglomeration of the moving refrigerant particles, a pair of auxiliary rotors 42, 43 are preferably provided adjacent the walls of lower housing portion 12 which extend parallel to the shafts 22, 23. Auxiliary rotors 42, 43 are preferably positioned immediately above the rotors 20, 21 and may be of any suitable character, but are illustrated as being elongate bars mounted for rotation on suitable shafts 44, 45. Shafts 44, 45 are respectively journaled for rotation in suitable bearings 46, 47 mounted on the exterior of lower housing portion 12. Auxiliary rotors 42, 43 are driven from a motor 50 by suitable belt and pulley drives 51, 52 and 53, 54.

Means is provided for feeding food products through upper housing portion 14 and downwardly into and through the upper portion of the bed of moving refrigerant particles in space 13 of lower housing portion 12 for chilling of these food products by the moving particles of solid refrigerant. This food product feeding means may be of any suitable character, but is illustrated as a chain conveyor 60 supported for longitudinal movement by suitable sprockets 61. For poultry carcasess P, chain conveyor 60 preferably includes suitable shackles 62 from which the poultry carcasses P are suspended for movement through the apparatus 10. Preferably, shackles 62 are so constructed that the body cavities of the poultry carcasses are substantially closed when the poultry is moved through the apparatus 10 to prevent the collection of an excessive amount of refrigerant therein. If packaged food products are to be moved through apparatus 10, then conveyor 60 would include suitable supporting means for such packages or for other shapes and sizes of food products.

Means for retarding the escape of $CO_2$ gas into the atmosphere are preferably provided at opposite ends of upper housing portion 14. These means may be of any desired character, such as vapor barrier or lock means, but are illustrated as flexible curtain means 63, 64. If desired, suitable ventilation means (not shown) may be connected to upper housing portion 14 to draw off and dispose of this gas.

Referring now to FIGURES 4 and 5, another embodiment of apparatus 10' incorporating the features of the present invention is shown and is generally similar to that described above. Accordingly, like reference characters with the prime notation added will be used for elements in this embodiment which generally correspond to elements in the previously described embodiment.

Apparatus 10' includes a housing 11' having respective lower and upper portions 12' and 14' defining therewithin respective enclosed spaces 13' and 15'. Adjacent the bottom of lower housing portion 12', there are mounted a plurality of rotors in excess of two and as illustrated, five such rotors 70, 71, 72, 73 and 74 are preferred. These rotors are of the same construction as the construction of rotors 20, 21 and therefore this construction will not be redescribed. Rotors 70, 71, 72, 73 and 74 are respectively mounted for rotation in suitable bearings 75, 76, 77, 80 and 81.

Rotors 70, 71, 72, 73 and 74 may be driven in any suitable manner but preferably are individually and respectively connected to motors 82, 83, 84, 85 and 86. Any desired connection between the rotors and motors may be utilized, but preferably the rotors are directly coupled to the motor drive shafts.

Rotors 70 through 74 may be driven in any desired direction except that the outside rotors 70 and 74 are preferably rotated in opposite rotative directions such that the upper peripheries thereof are traveling toward the center of the housing as indicated by the arrows in FIGURE 5. Also, the medial rotors 71, 72 and 73 are preferably rotated at a faster rate than the outermost rotors whereby the bed of moving refrigerant particles formed thereby will be higher in the center than at the sides thereof.

Suitable means 17' is connected to housing 11' through a metering device 18' to deliver the desired amounts of finely divided particles of solid refrigerant thereinto. Also, a suitable chain conveyor 60' or the like is provided for moving food products to be chilled through housing 11'. Due to the shape of the bed, it is not necessary that the conveyor be displaced from a straight line to move the food products through the bed of moving refrigerant particles.

In operation, the rotors 20, 21 or 70–74 are respectively driven by the motors connected thereto and a predetermined amount of finely divided particles of solid refrigerant, as for example 30 pounds of $CO_2$ snow and 30 ounces of wet ice with apparatus 10, is delivered into space 13 or 13' in lower housing portion 12 or 12'. The rotors impart substantially continuous motion to these refrigerant particles, alternately throwing them upwardly and letting them fall back into the bottom of the lower housing portion. In apparatus 10, auxiliary rotors 42, 43 keep any refrigerant particles attempting to agglomerate on the walls of housing 11 knocked therefrom and aid rotors 20, 21 in preventing agglomeration. In apparatus 10', the outermost rotors 70, 74 serves a similar function. The rotors maintain the particles very small and the pivotal mounting of the blades is a safety factor and an operational aid in this respect.

The food products to be chilled are moved through housing 11 or 11' and the bed of refrigerant particles by conveyor 60 or 60' and the moving refrigerant particles impinge directly against all sides thereof in direct solid-to-solid heat transfer relationship therewith. The length of time the food products remain in the bed of moving refrigerant particles is correlated to the amount of cooling required and the heat transfer rate or rate of cooling. This time period may be varied by varying the speed of conveyor 60, 60', or the horizontal dimension of space 13, 13' in the direction of movement of the food products or both.

It is therefore believed apparent that a novel apparatus for and method of chilling food products utilizing finely divided particles of solid refrigerant have been provided which provide distinct advantages over prior apparatus and methods.

In the drawings and specification there have been set forth preferred embodiments of the invention and, although specific terms are employed, they are used in a generic and descriptive sense only and not for purposes of limitation, the scope of the invention being defined in the claims.

We claim:

1. Apparatus for chilling food products utilizing finely divided particles of solid refrigerant, said apparatus comprising,
    (a) a housing defining a space therewithin having a predetermined vertical dimension and adapted to receive therewithin a predetermined amount of finely divided particles of solid refrigerant,
    (b) rotary impeller means mounted within the lower portion of said housing and communicating with said space,
    (c) means operatively connected to said rotary impeller means for rotating said impeller means at a relatively high velocity to impart substantially continuous vertical motion to the finely divided particles of solid refrigerant and for forming a bed of such moving refrigerant particles within said space while preventing agglomeration of the refrigerant particles,
    (d) means passing through the upper portion of said housing for feeding food products to be chilled through said space defined within said housing and through said bed of moving refrigerant particles above said impeller means and at a rate correlated to the heat transfer rate and amount of cooling required, and
    (e) means connected to said housing for feeding metered amounts of the finely divided particles of solid refrigerant into said space.

2. A method of chilling food products utilizing a housing defining a confined space therewithin comprising the steps of
    (a) forming a bed of substantially continuously, generally vertically moving, finely divided particles of solid refrigerant within the confined space defined by the housing by mechanically agitating a predetermined amount of the solid refrigerant particles by relatively fastly rotating impellers communicating with the lower portion of the confined space, and
    (b) passing the food product to be chilled through the housing and through the bed of moving particles of solid refrigerant at a rate correlated to the heat transfer rate between the solid refrigerant and the food product and to the amount of chilling of the food product required.

3. A method according to claim 2 including
    (c) replenishing the solid refrigerant as it is used in the chilling of the food product.

4. A method according to claim 2 wherein the solid refrigerant comprises solid carbon dioxide particles.

5. A method according to claim 4 including
    (c) delivering metered amounts of liquid carbon dioxide into the housing wherein it expands and forms finely divided particles of solid carbon dioxide to replenish the supply of refrigerant in the housing as it is used in the chilling of the food product.

6. A method according to claim 5 including
    (d) additionally mechanically agitating the solid refrigerant particles adjacent the sides of the housing above said rotating impellers to prevent agglomeration of the refrigerant particles.

7. A method according to claim 5 wherein the refrigerant particles are agitated faster in the center of the housing than at the sides thereof so that the bed formed by the moving particles is higher in the center than at the sides thereof.

8. Apparatus according to claim 1, werein said impeller means comprises a plurality of rotors mounted in said housing within the lower portion of said space for rotation about spaced-apart, parallel, generally horizontal axes, and drive means connected to said rotors for rotating the same in such directions and at such speeds as to impart the substantially continuous motion to the refrigerant particles.

9. Apparatus according to claim 8, wherein said plurality of rotors comprises a pair of rotors driven in counter-rotation with the adjacent peripheral portions thereof moving upwardly adjacent the center of the housing.

10. Apparatus according to claim 9, including
    (c) means mounted above said rotors within said housing and adjacent the sides thereof for preventing agglomeration of the refrigerant particles on the sides of the housing.

11. Apparatus according to claim 10, wherein said means (c) for preventing agglomeration comprises a pair of auxiliary rotors mounted for rotation about axes parallel to the axes of said first recited rotors and means connected to said auxiliary rotors for rotating the same to prevent particles of refrigerant from adhering to the sides of said housing.

12. Apparatus according to claim 8, wherein each of said rotors includes a plurality of diametrically opposed blades mounted for free pivotal movement relative to each other and the remainder of the rotor.

13. Apparatus according to claim 12, wherein each of said rotors comprises a shaft, a plurality of spaced apart hub members mounted on said shaft for rotation therewith, and a pair of blades pivotally mounted on each of said hub members at diametrically opposed points spaced outwardly from said shaft.

14. Apparatus according to claim 13 wherein the blades of one of said rotors are spaced axially from the blades of the other of said rotors and overlap therewith during rotation of said rotors.

15. Apparatus according to claim 8, wherein said plurality of rotors are more than two in number and the outermost rotors thereof are rotated in such directions that the upper peripheral portions move toward the center of the housing to aid in preventing aggolmeration of the particles of solid refrigerant.

16. Apparatus according to claim 15, wherein at least the medial ones of said rotors are driven at a faster rate than the outermost rotors to form a bed which is higher in the center than at the sides.

References Cited

UNITED STATES PATENTS

| | | | |
|---|---|---|---|
| 2,640,333 | 6/1953 | Bailey | 62—57 |
| 2,761,769 | 9/1956 | Elder | 34—10 X |
| 2,870,480 | 1/1959 | Meakin | 62—321 X |
| 2,893,216 | 7/1959 | Seefeldt et al. | 62—384 X |
| 3,214,928 | 11/1965 | Oberdorfer | 62—64 X |
| 3,304,732 | 2/1967 | Rubin | 62—321 X |

WILLIAM E. WAYNER, Primary Examiner

U.S. Cl. X.R.

62—384